(12) United States Patent
Gresham

(10) Patent No.: US 6,741,558 B1
(45) Date of Patent: May 25, 2004

(54) METHOD AND APPARATUS FOR EVENT DETECTION IN A SWITCHING SYSTEM

(75) Inventor: Paul Gresham, Amprior (CA)

(73) Assignee: Mitel Corporation, Ontario (CA)

( * ) Notice: Subject to any disclaimer, the term of this patent is extended or adjusted under 35 U.S.C. 154(b) by 0 days.

(21) Appl. No.: 09/343,227

(22) Filed: Jun. 30, 1999

(30) Foreign Application Priority Data

Jun. 30, 1998 (GB) .............................................. 9813971

(51) Int. Cl.$^7$ .............................................. H04L 12/26
(52) U.S. Cl. ........................ 370/230; 710/58; 709/201; 709/318
(58) Field of Search ................................. 370/216, 218, 370/241, 243, 245, 250, 400, 410, 229, 230, 389; 709/200, 201, 202, 203, 318; 710/40, 58

(56) References Cited

U.S. PATENT DOCUMENTS

| | | | |
|---|---|---|---|
| 5,410,542 A | * 4/1995 | Gerbehy et al. | 370/364 |
| 5,655,081 A | * 8/1997 | Bonnell et al. | 709/202 |
| 5,682,328 A | * 10/1997 | Roeber et al. | 702/187 |
| 5,867,496 A | * 2/1999 | Peres et al. | 370/376 |
| 5,867,659 A | * 2/1999 | Otteson | 709/224 |
| 5,987,560 A | * 11/1999 | Gulick | 710/266 |
| 6,006,016 A | * 12/1999 | Faigon et al. | 714/26 |
| 6,343,086 B1 | * 1/2002 | Katz et al. | 370/489 |
| 6,404,743 B1 | * 6/2002 | Meandzija | 345/736 |
| 6,507,579 B1 | * 1/2003 | Gresham | 370/358 |

FOREIGN PATENT DOCUMENTS

| | | |
|---|---|---|
| GB | 1413894 | 11/1975 |
| GB | 2006573 | 5/1979 |
| WO | 95/32569 | 11/1995 |
| WO | 96/20548 | 7/1996 |

OTHER PUBLICATIONS

Baker et al. "A Priority Event Monitor for Interrupt–Driven Microprocessor". IEEE. Apr. 7, 1991–Apr. 10, 1991. pp. 905–909.*

Flegg, Robb. "Computer Telephony Architectures: MVIP, H–MVIP, and SCbus" IEEE Communications Magazine. Apr. 1996. pp. 60–64.*

* cited by examiner

Primary Examiner—Chi Pham
Assistant Examiner—Derrick W Ferris
(74) Attorney, Agent, or Firm—Staas & Halsey LLP

(57) ABSTRACT

An event detector for detecting a plurality of different possible asynchronous events from any of a plurality of source addresses and nodes, debouncing the events and, once a valid event has been identified and confirmed, formatting and transmitting a message via a message transport system to a predetermined destination address for further appropriate action. According to the preferred embodiment, each event is time-stamped so that latency in the message transport system does not affect time-critical events. Thus, the transmitted message identifies the source address, source node, an event number for identifying the event, and a time-stamp associated with the event.

4 Claims, 5 Drawing Sheets

METHOD AND APPARATUS FOR EVENT DETECTION IN A SWITCHING SYSTEM

FIELD OF THE INVENTION

This invention relates in general to interface circuits in Open Telecom Platform (OTP) communication systems, and more particularly to a detector in an interface circuit for signaling the occurrence of unexpected asynchronous events within the system to a predetermined destination address using structured messages.

BACKGROUND OF THE INVENTION

Many modern CODECs (Coder-Decoders) and trunk interface circuits provide line status information in a serial format. Traditionally, the detection of asynchronous events, such as a line going off-hook, has been accomplished by means of microprocessor polling or sampling of predetermined line status bits to detect logic level changes. This has required either the use of a dedicated microprocessor at each node which is capable of indicating a status change, or the provision of a mechanism by which all status information is switched through the system to a central microprocessor. Both of these prior art approaches require dedicated system resources, either in the form of local microprocessors or additional switching circuits.

SUMMARY OF THE INVENTION

According to the present invention, an event detector is integrated into a Peripheral Interface Application Specific Integrated Circuit (PASIC) which is used as an interface between serial data streams in an OTP switching system. According to the preferred embodiment, the PASIC device which incorporates the event detector, is used as an interface between a plurality of serial links configured according to the Mitel® ST-BUS standard and a further plurality of serial links configured according to the H.100 of generic high-bandwidth TDM (Time Division Multiplex) bus and control, issued by the ECTF (Enterprise Computer Telephony Forum—a telecommunications standards agency). Thus, the event detector of the present invention requires no additional system resources since it is incorporated within an existing piece of hardware within the OTP system.

The event detector of the present invention detects a plurality of different possible asynchronous events (up to 256 events in the preferred embodiment) from any of a plurality of source addresses and nodes, debounces the event and, once a valid event has been identified and confirmed, formats and transmits a message via a message transport system to a predetermined destination address for further appropriate action. According to the preferred embodiment, each event is time-stamped so that latency in the message transport system does not affect time-critical events. Thus, the transmitted message identifies the source address, source node, an event number for identifying the event, and a time-stamp associated with the event.

BRIEF DESCRIPTION OF THE DRAWINGS

A detailed description of the preferred embodiment of the present invention is described herein below, with reference to the drawings in which.

DETAILED DESCRIPTION OF THE PREFERRED EMBODIMENT

As discussed above, the event detector of the present invention is incorporated into a PASIC device used in an OTP communications system. OTP represents a generic platform for the development of a wide range of telecommunications products encompassing both traditional PBXs and emerging convergent CTI systems. It provides generic services and capabilities, both hardware and software, for use as basic building blocks in specific product instances. Examples of software applications are voice mail and automated attendant which may be invoked using APIs (Application Programming Interfaces) such as TAPI (Telephony Application Programming Interface). Hardware examples include primary power interconnects (e.g. AC mains or DC input), PSTN interfaces (e.g. LS/Class and T1), and on-premise interfaces (e.g. Digital Network Interface Card (DNIC), fiber, etc.)

Prior to describing the preferred embodiment of event detector according to the present invention, a background description will be provided of the basic OTP network, node, and card models, followed by an overview of the OTP message routing and control functions which are inherent in the functionality of the event detector as well as OTP messaging categories, structures, addressing, message transport and routing.

Figure 1:
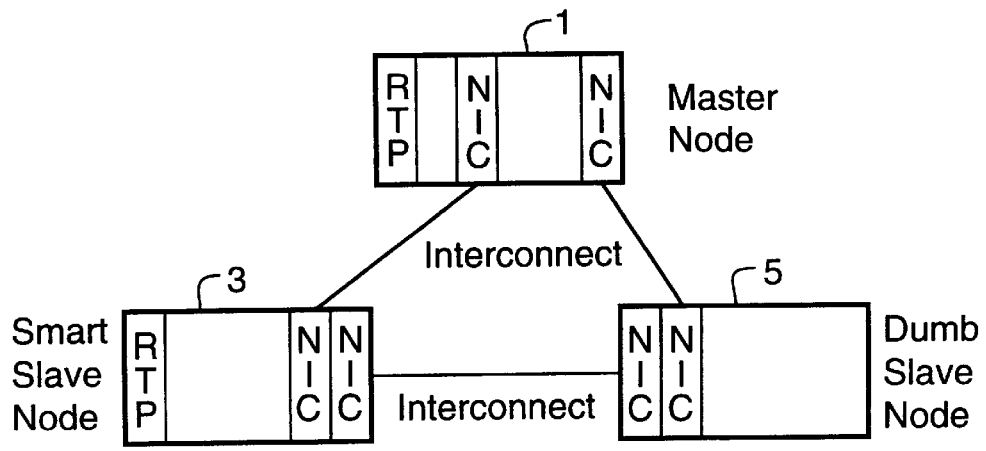
FIG. 1 is a block diagram of an OTP network reference model.

In an OTP system, a plurality of nodes may be interconnected, as shown in the representative model of FIG. 1. For simplicity, external interfaces (e.g. the PSTN) are not illustrated. A master node 1 may be connected to one or both of a smart slave node 3 or a dumb slave node 5. Each of the nodes includes a plurality of Node Interconnect Cards (NICs). The master node 1 and smart slave node 3 further include intelligence functionality in the form of a Real Time Processor (RTP). The interconnect media between nodes can consist of a single or multiple paths and, architecturally, may be realized as point-to-point connections or as paths provided via a network.

The master node 1 exerts fundamental responsibility for real-time telephony functionality within the system. This node is able to determine its responsibility by detecting one of either a full system program load (e.g. via a program card or flash memory), or a prime program download (e.g. by means of an Ethernet port connected to a remote system). In some embodiments the master node RTP will provide the sole processing function for the OTP system. In other embodiments, subordinate processing functions may be provided in other nodes, such as smart slave node 3, in which case the master node RTP establishes the operational parameters for the subordinate processing functions (e.g. via initialization and a subordinate download operation).

The smart slave node 3 provides at least one subordinate processing function via its RTP, for controlling its associated node. Other processors may be resident on the node for providing other system functions, but only one RTP assumes node control responsibility.

The dumb slave node 5 provides no node control processing functionality. Instead, its NIC acts as a proxy for a remote node controller (i.e. master node 1 or smart slave node 3). It will be appreciated that the dumb slave node 5 may incorporate processing resources, none of which provide a node control function.

Figure 2:
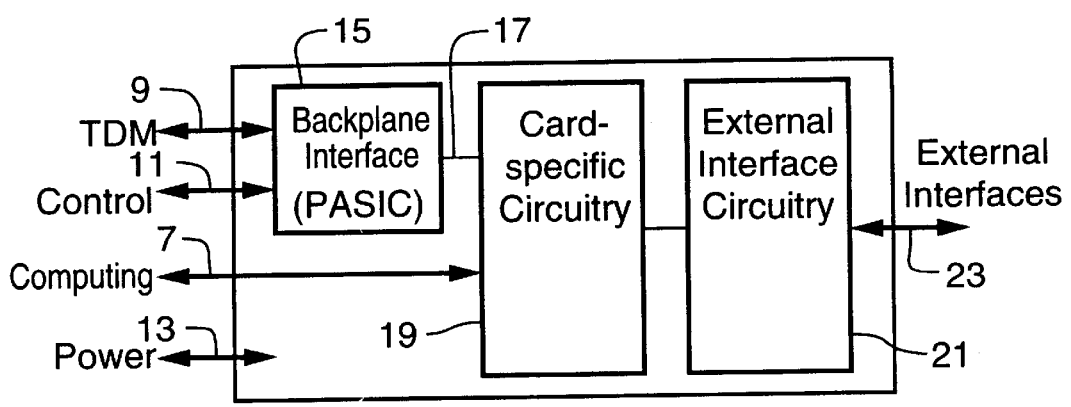
FIG. 2 is a simplified block diagram representing an OTP card including a PASIC device which incorporates the event detector of the present invention.

FIG. 2 shows a reference model for an OTP card capable of providing the NIC functionality discussed above. Where the node type is a so-called IT (Information Technology) node, a high-speed computing bus 7 is provided which, according to the preferred embodiment, is a Compact PCI (cPCI) 32/64-bit local bus. Both the IT node and telecom node include a high-bandwidth circuit switching TDM bus 9 which, according to the preferred embodiment, conforms to the H.100 structure of 32×8 Mbps links and a 2 Mbps CSMA/CD messaging channel. A control bus 11 provides a command and control path between the RTP and NIC cards in telecom nodes where there is no computing bus 7. Nonetheless, the control bus is provided for both IT nodes and telecom nodes. The control bus 11 is based on the H.100 standard for providing a single-wire bi-directional collision-based control signal (referred to herein as the message channel), card location identification and node identification. Finally, a power bus 13 is provided for introducing the required voltage rails in accordance with the H.100 standard and cPCI standard.

PASIC device 15 provides an interface for telecom-related support functions provided by the H.100 TDM busses 9 and a plurality of bi-directional serial links 17, which are configured according to the ST-BUS protocol. Additional functional and operational details of the PASIC device 15 and the event detector incorporated therein, are provided below.

Card-specific circuitry 19 provides the basic functionality of the OTP card, and may include computing or database functionality in an IT node, or call control or feature functionality in a telecom node. For telecom functions, the circuitry 19 communicates with the backplane PASIC interface 15 via ST links 17. Control signaling may derive from the computing bus 7, the H.100 message channel (via control bus 11), TDM bus 9, or a combination thereof.

The external interface circuitry 21 provides the functionality necessary to provide external interfaces 23, for the OTP card to the outside world. Some OTP cards require no connection to the outside world (e.g. DSP cards for tone detection, conferencing, etc.). Examples of common external interface circuitry include node interconnects (e.g. FIM), Local Area Network (e.g. Ethernet) as well as analog and digital telephony interfaces (e.g. ONS, LS/Class, DNIC, T1, etc.)

OTP employs six functions for the purposes of message routing and control, namely: slot address, node address, destination address, source address, message routing and messaging control.

Each peripheral (e.g. card assembly) is provided with a slot address which is unique to a predetermined slot in a card shelf and which is included in a predetermined field of a message transmitted by the peripheral for the purpose of identifying the card.

The node address is the logical address of a particular physical shelf. On power-up, each peripheral sets its internal node address to a default value.

A destination address is programmed for each physical entity upon system initialization, as a location to which the entity may send unsolicited messages, such as asynchronous events. The destination address takes the form of a node address and a slot address. For the purpose of the event detector of the present invention, the destination address identifies a processor within the system whose function is to deal with unsolicited messages regarding events, etc.

The source address indicates the address of the originator of a message by its node address and slot address, for use by the recipient processor as a destination address when sending a reply.

The message routing function allows NICs to determine the node(s) to which they are allowed to forward messages. It will be appreciated that, in a fully-meshed system of nodes, the message routing function is required to prevent multiple occurrences of messages and to automatically re-route messages in the event of node interconnect outages.

The messaging control function governs whether a peripheral is permitted to send unsolicited messages, as discussed briefly above.

There are two fundamental classes of messages within OTP, namely card control and signaling. Card control messages are significant at a card level rather than a circuit level. This includes the function of circuit switch control. These card control messages operate across all card types, and are significant regardless of whether a card is smart or dumb. Signaling messages have significance at the circuit level, and involve all aspects of circuit control and configuration for the primary purpose of call control.

There are also two fundamental types of messages within OTP, namely solicited messages and unsolicited messages. Solicited messages are those commands and replies which are initiated from a node controller whereas unsolicited messages are those commands and replies which are initiated from a peripheral card.

Figure 3:
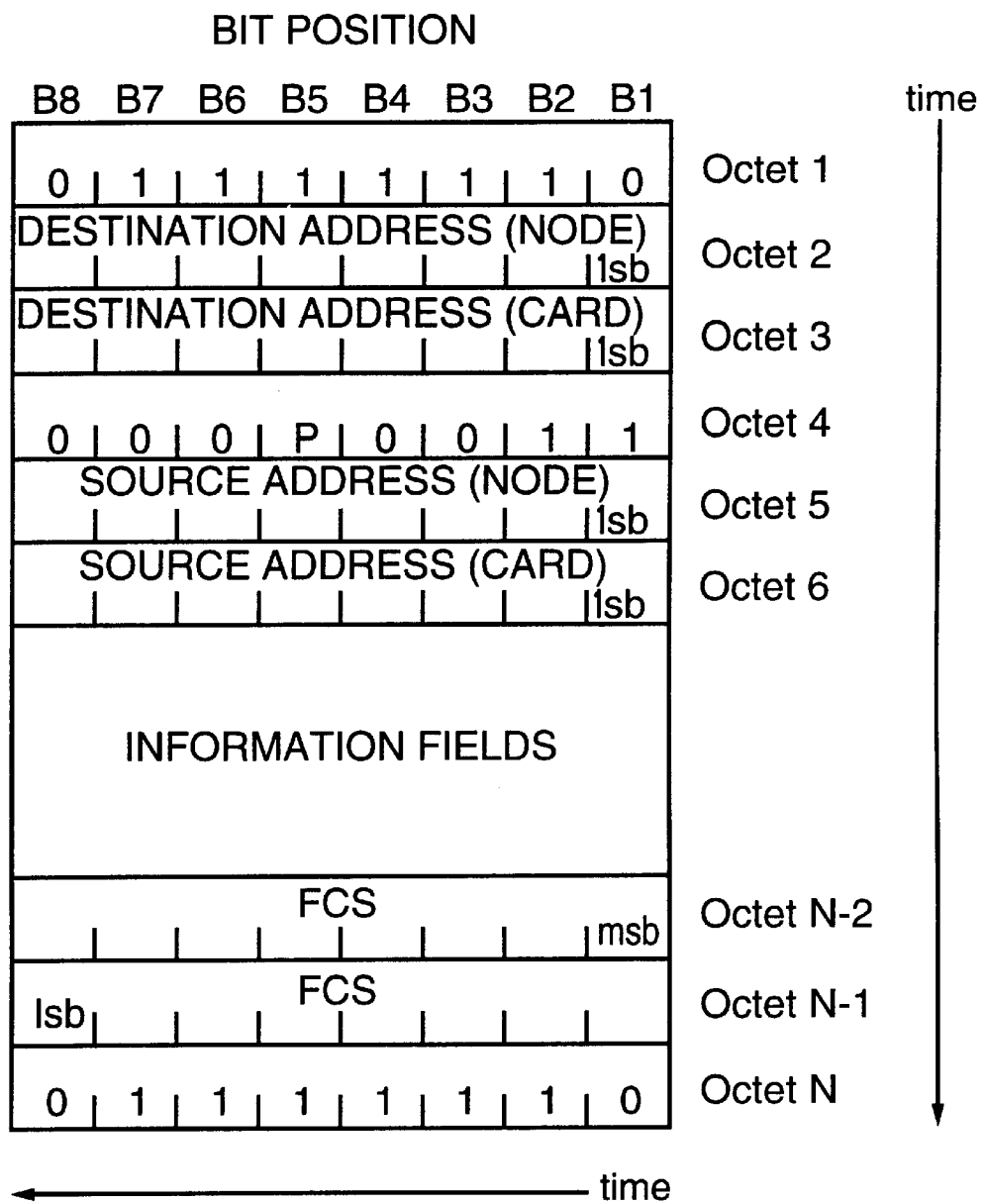
FIG. 3 is a diagram representing the preferred message structure in accordance with the OTP model.

The OTP message structure conforms to an HDLC layer 2 structure as shown in FIG. 3, and is based on an extension of the structure defined in ANSI/VITA 6. Each message is bounded by opening and closing flags having a value of 7EH (octets 1 and N). Octets 2 and 3, and octets 5 and 6 contain the destination and source addresses, respectively, each consisting of a node address and slot address. The least significant bit (B1) of all address octets is an Extension Address indicator bit which, when set, indicates the end of the address field. Bit B2 in the first octet is a Command/Response bit which, when set, indicates that the packet is a command. The PASIC device 15 ignores all packets which are not commands and all packets that do not include two destination address octets. Bits B3 to B7 of Octets 2 and 5 identify the NODE ID, bits B7 and B8 of octets 3 and 6 identify the SUB ID, while bits B2 to B6 of octets 3 and 6 identify the SLOT ID field. The "P" bit in the control field (octet 4) is used to indicate whether an acknowledgement of the command is required to be sent. If the "P" bit is clear, there is no requirement for an acknowledgement. Bits B2 to B4 in the control field constitute a sequence (SEQ) field (shown in the example of FIG. 3 as having a value of 001) which is used for command responses and acknowledgements. Unsolicited command message packets from the event detector of the present invention use an incrementing bit pattern in the sequence field to uniquely identify each command being responded to. This field is copied from the command packet into the response packet.

The first octet of the INFORMATION FIELDS shown in FIG. 3, is referred to as the command octet, and is divided into two nibbles. The most significant nibble is the command OP-CODE, which describes the basic operation. The least significant nibble is referred to as EXT/MOD, wherein the extension and/or modifiers are used to indicate a sub-class of operation and/or additional information, respectively. Thus, during system initialization, a command having an OP-CODE of SET_CONFIG, with no modifier and an EXTENSION of UNSOLICIT_ADDR, is used to set the NODE_ID and SLOT_ID of a system processor to which all unsolicited messages are to be sent (e.g. event messages generated by the event detector of the present invention). The bit allocations for the unsolicited message destination address are as follows (where X indicates "does not matter"):

| 7 | 6 | 5 | 4 | 3 | 2 | 1 | 0 |
|---|---|---|---|---|---|---|---|
| X | X | X |   |   | NODE ID | | |
| X |   | SUB |   |   | SLOT ID | | |

Figure 4:
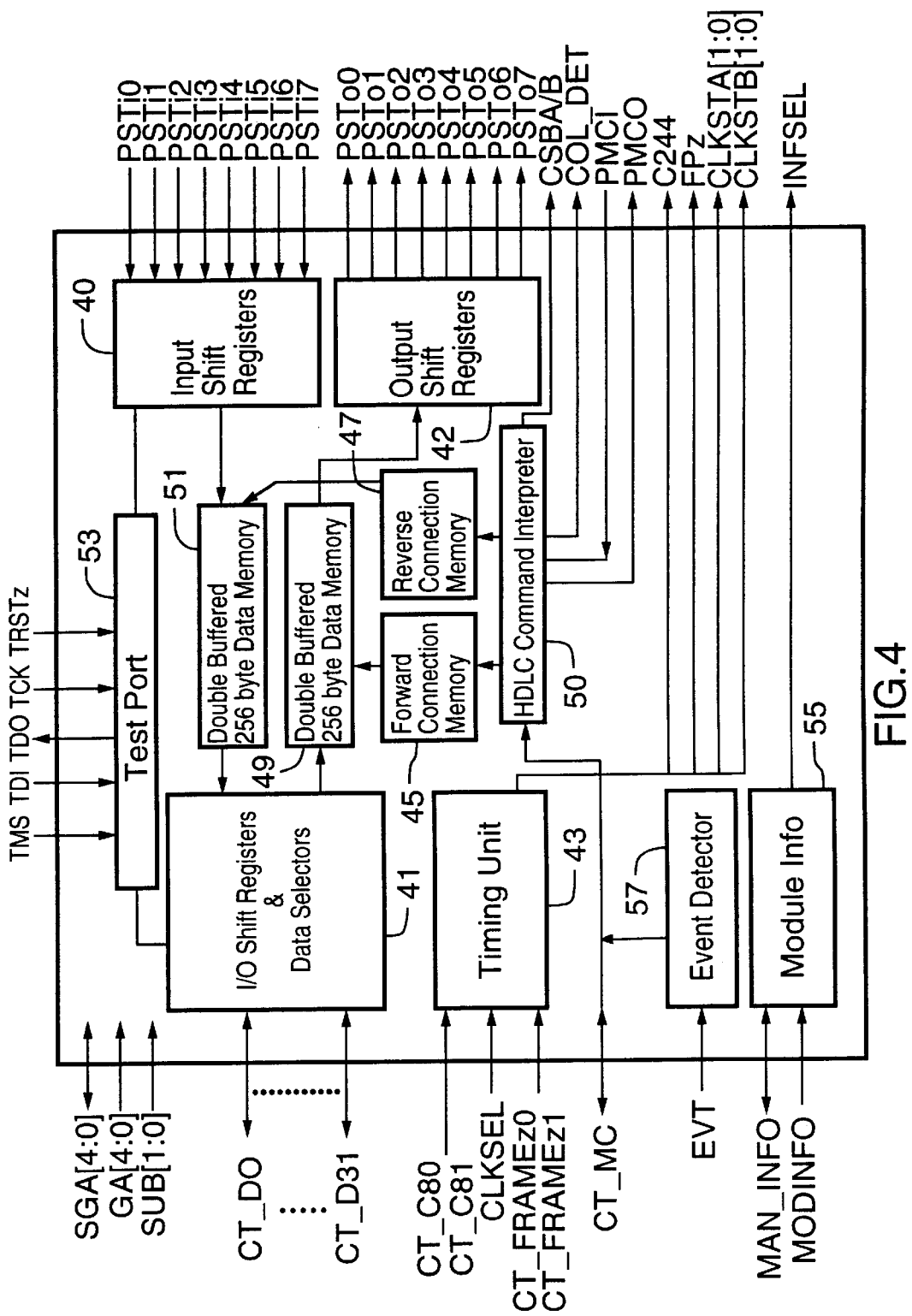
FIG. 4 is a block diagram of the PASIC device illustrated in FIG. 2.

A block diagram of the PASIC device 15 is provided in FIG. 4. As discussed briefly above, the PASIC device is used to interface up to eight standard 2 MHz ST-BUS links 17 (FIG. 2) with thirty-two standard H.100 TDM data links 9, with control being achieved through a dedicated control message channel, CT_MC, as described in greater detail below.

The H.100 TDM bus 9 is shown in greater detail with reference to FIG. 4 as containing thirty-two circuits, identified as CT_D0 to CT_D31, which are terminated at a block of I/O shift registers and data selectors 41. The default operating speed of each circuit is 8 Mbits/s, resulting in 128 channel time-slots per circuit, with each time-slot being further divided into eight bits. Each CT_D circuit can act as both an input and an output. The H.100 TDM bus 9 thus has a total switching capacity of 4096 channels.

The 2 MHz ST-BUS 17 contains eight input links (PSTi0–PST17) terminating at input shift registers 40 and eight output links (PSTo0–PSTo7) terminating at output shift registers 42. Each of the input and output ST-BUS links carries thirty-two channel time slots for a total of 8×32=256 channels.

Thus, according to an aspect of the PASIC device 15 which does not form part of the present invention, but which is the subject of a corresponding patent application by Paul Gresham entitled PASIC Digital Switch Method (Attorney Docket No. 8061-70), digital switching is performed from the 4096 channel bus 9 to the 256 channel ST-BUS 17 without any requirement for a large input buffer.

A master clock signal (CT_C8x) marks the bit timing and a frame pulse signal, (CT_FRAMEx) is used to mark each frame boundary, by operation of a timing unit 43. More particularly, the master clock inputs are provided by the signal pairs (CT_C80, CT_FRAMEz0) and (CT_C81, CT_FRAMEz1), which correspond directly to the H.100 A and B clock sources, with the CLKSEL signal being used to select the clock source from the one of the two clock pairs. Output signals CLKSTA[1:0] and CLKSTB[1:0], together, code the status of the input clock sources A and B, respectively.

Two internal 256 word connection memories 45 and 47 are provided. Forward connection memory 45 provides time domain switching information in respect of the H.100 circuits CT_D0 to CT_D31 from a first double buffered data memory 49, under control of HDLC command interpreter 50 to the 2 MHz ST-BUS output links PSTo0–PSTo7. Reverse connection memory 47 provides time domain switching information in respect of the 2 MHz ST-BUS input links PSTi0—PSTi7 from a second double buffered data memory 51, under control of HDLC command interpreter 50 to the H.100 circuits CT_D0 to CT_D31. Information in memories 49 and 51 is altered and monitored by command interpreter 50 using a command/response protocol discussed in greater detail below.

A test port 53 is provided for JTAG test bus interface purposes, and does not form part of the present invention.

A module info circuit 55 receives an ST-BUS compatible input signal, MODINFO, for sourcing peripheral module information. The INFSEL signal indicates the start of a module information command, which is used to initialize loading and shifting hardware. MOD_ID represents an 8 bit bus used to return the card ID in response to a report module ID command. MAN-INFO represents a 1-wire serial EPROM, used to ID PROM contents in response to a REPORT-MAN_INFO command. None of these signals and circuit functionality are germane to the present invention.

According to the present invention, an event detector 57 is provided for monitoring ST-BUS 17 for up to 256 status change indications. As discussed briefly above, when an unexpected asynchronous event is detected, the event is time-stamped, and an unsolicited message is created within the PASIC device 15 and transmitted to a predetermined remote node and slot address. In the preferred embodiment, four types of events may be detected, as follows: (1) contention on the H.100 TDM bus 9, (2) command messages while the PASIC device 15 is busy, (3) changes in clock status, and (4) logic high occurrences on the EVT signal input to detector 57. Other event types are possible. For simplification purposes, the remainder of this disclosure considers only external events originating on the ST-BUS compatible EVT input.

An event is deemed to have occurred when the EVT input goes to a logic high level for any one of the 256 bit times in a given frame. As discussed in greater detail below, circuitry is provided for sampling the EVT signal at the ¾ time of each bit period, capturing the bit position of the event and time-stamping the event. The event is then monitored for an additional frame for de-bouncing purposes. If the event input remains high after two consecutive frames, the PASIC device 15 originates an unsolicited message to signal the event. The message destination address corresponds to that which was set during initialization, using the SET_CONFIG_UNSOLICIT_MSG command. This message is formatted with the "P" bit in the HDLC control octet cleared, and the SEQ field in the HDLC control octet set to the next 3-bit number from that of the last EVENT_CHANGE command message sent, as described in greater detail below. The source address is set to the slot, sub-slot and node of the card originating the message. The remaining message format is as follows:

| OP-CODE | Extensions | Bytes | Packet Format |
|---|---|---|---|
| EVENT_CHANGE | <none> | 4 | 8 bit: <command code> |
| | | | 8 bit: <bit position> |
| | | | 16 bit: <time-stamp> |

The message is re-transmitted every 500 ms until the source of the event has been removed.

When the designated system processor receives an unsolicited external event message from a PASIC device 15 within the system, it then takes the necessary action to clear the event. This typically involves the activation of processes for dealing with the event, followed by a return message to the OTP card housing the PASIC device 15 which originated the message, in order to clear the event detection.

Figure 5:
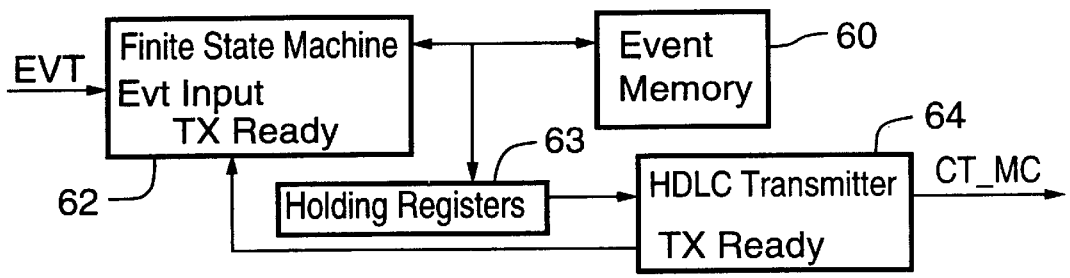
FIG. 5 is a block diagram illustrating the functional components of an event detector forming part of the PASIC device in FIG. 4, according to a preferred embodiment of the invention.

FIG. 5 is a block diagram illustrating the functional components of the event detector 57. An 8-entry, fully associative event memory 60 is used to store event information, with each of the eight memory locations constituting an instance of the event detector 57, resulting in a total of eight detectors per card. A finite state machine 62 is used to control the operation of the eight event detectors. A plurality of holding registers 63 form a buffer between finite state machine 62 and event memory 60 and a HDLC transmitter 64.

Figure 6:
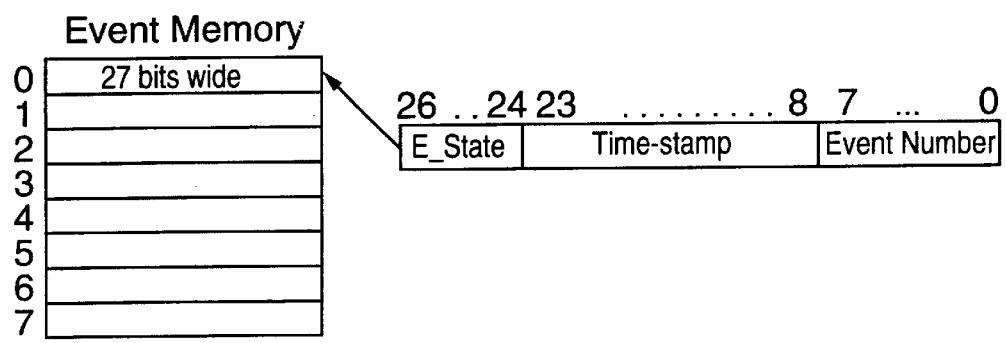
FIG. 6 is a diagram showing event memory layout in accordance with the preferred embodiment.

As shown in FIG. 6, each memory location stores (1) an 8-bit event identifier for identifying 256 possible (programmable) events, (2) a 16-bit time-stamp for identifying 65536 possible time instances at which an event can occur in a given frame, and (3) a 3-bit event state for defining eight possible states (referred to herein as states S0 to S7). The initial state of each event detector is S0.

Figure 7:
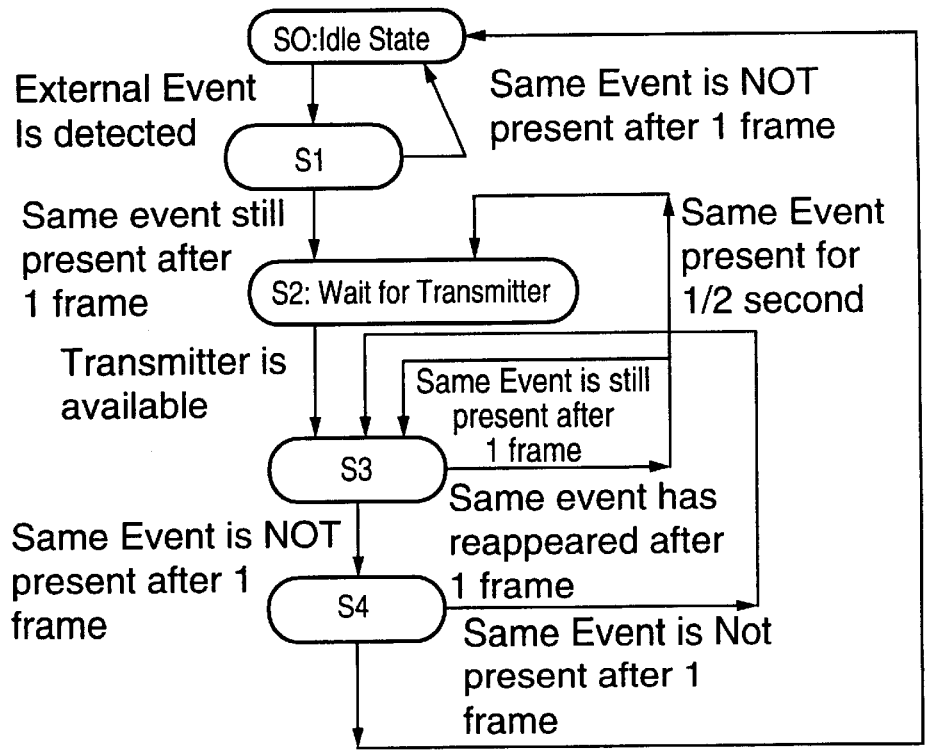
FIG. 7 is a state transition diagram for event states in accordance with the preferred embodiment.

FIG. 7 illustrates the state transitions and operation of one event in memory 60. When an event is detected at the EVT input from the idle state (S0 in FIG. 7), the memory 60 is scanned to see if the associated event number has already been stored in the event identifier field. The event number is determined from the numerical bit position of the event relative to the ST-BUS frame: 0–255. If the event number is not found, then the first memory location whose state is S0 is selected for storage. The event number is written into the event identifier field, a time-stamp value is written into the time-stamp field and the state of the selected memory location is then advanced to S1. If, on the other hand, the event number is located in response to scanning the memory 60, then the first occurrence of the event is selected and the state of the selected memory is advanced from S1 to S2, indicating that the message is queued to be sent.

On the other hand, if on the scan following advancement of the memory location state from S0 to S1, the event is no longer detected, then the event is effectively "de-bounced" by resetting the memory location state from S1 to S0.

Once the HDLC transmitter 64 is available (i.e. not already transmitting a packet), all memory locations are scanned for event states having value S2. If a memory location is located whose event state is S2, then the event number and time-stamp for that memory location are transferred to an HDLC output buffer 63 and the HDLC transmitter 64 is activated to transmit the message packet according to the message format indicated in FIG. 3. The event state for the selected memory location is then advanced to S3. Although the preferred embodiment utilizes HDLC messaging protocol, it will appreciated by a person of ordinary skill in the art that the exact format of the message packet is not important, provided that the message contains the event number and time-stamp, and that protocols other than HDLC can be utilized.

As long as the HDLC transmitter 64 is busy transmitting a packet, the event memory state does not advance from state S2, thereby ensuring that all events result in the transmission of at least one message.

Once a memory location has advanced to a state of S3, the state remains static until such time as the event is cleared by the appropriate process. Furthermore, if the event state of the memory location remains in state S3 for more than ½ second, then the event state is reset at S2 in order to cause another HDLC packet to be sent. Once the event has been cleared, the memory state advances from S3 to S4. After the subsequent scan (following the passage of the next frame), the EVT signal is scanned to ensure that it remains clear, in which case the state of the memory location advances from S4 back to S0. However, if it is determined as a result of the subsequent scan that the event has not been cleared, then the prior apparent clearing of the event is deemed to be the result of a signal anomaly and the state of the memory location is reset from S4 to S3.

Figure 8:
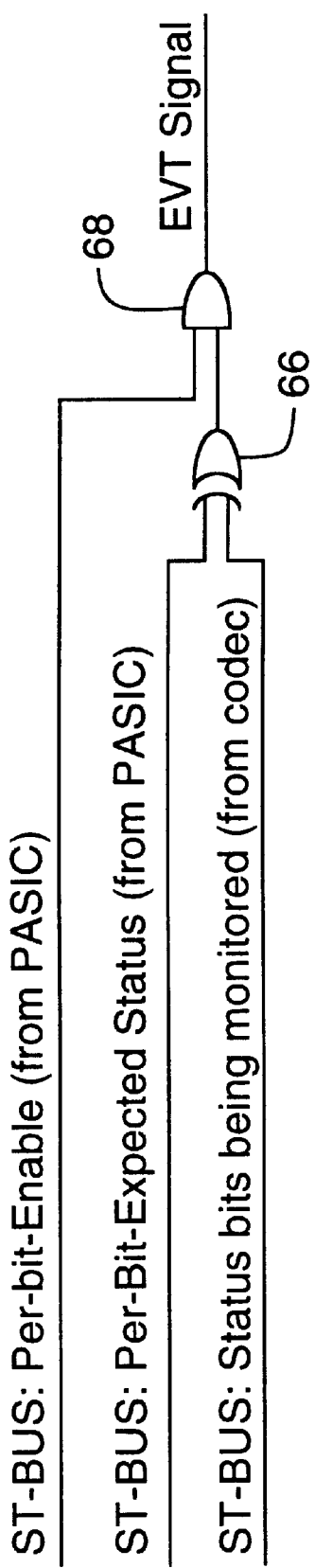
FIG. 8 is a logic diagram showing circuitry for generating an event (EVT) signal in accordance with the preferred embodiment.

The EVT signal is meant to be generic, in that it may represent any asynchronous event from any portion of the system. As an example, only, FIG. 8 shows two of the eight ST-BUS outputs used in message mode (i.e. controlled on a channel-by-channel basis) to control the characteristics of the event detector, with one output being used as the event ENABLE and the other output being used as a source for the EXPECTED status. In this configuration, the status link being monitored is applied to a first input of EXCLUSIVE-OR gate 66 and the EXPECTED status is applied to the second input thereof. The output of gate 66 is connected to a first input of AND gate 68 whose second input is connected to the ENABLE link. The output of gate 68 is connected to the EVT input of event detector 57. The result of the illustrated embodiment is a fully generic event detector with per-bit control that can be fabricated using only two external SSI gates.

It will be appreciated that, although a particular embodiment of the invention has been described and illustrated in detail, various changes and modifications may be made. For example, the remaining three unused states (S5, S6 and S7) can be used to cause signalling of other unrelated asynchronous events. In the case of the PASIC device according to an actual implementation, these states have been used to identify the BUSY, H.100 contention and clock status change events referred to briefly above. In operation, if one such unrelated event is present, the memory moves from state S0 (or S4, or S5, or S6), and the appropriate relevant data is stored in the time-stamp and/or event number fields in the event memory location. Then, a wait state ensues pending availability of HDLC transmitter 64. When the HDLC transmitter becomes available, the stored data is moved from the time-stamp and/or event number fields in the event memory location into the holding registers 63 for the transmitter 64.

The principle of the present invention can be extended to larger memories capable of holding more than eight events and larger time-stamps. The invention can be applied to systems which utilize different TDM bus formats than H.100 or ST-BUS, as well as different data packet formats than HDLC. All such changes and modifications may be made without departing from the sphere and scope of the invention as defined by the claims appended hereto.

What is claimed is:

1. Apparatus for detecting an asynchronous event in a communication system and signaling occurrence of said event by transmitting a message to a predetermined device, comprising:

an input device for sampling at least one input signal location of said communication system for the occurrence of said event;

a message transmitter for creating and transmitting said message to said predetermined device for each said occurrence of said event; and an event detector connected to said input device and said message transmitter for (i) delaying activation of said message transmitter for a first predetermined time period in order to ensure validity of the occurrence of said event at said input device, and (ii) causing said message transmitter to re-transmit said message in the event said event persists at said input device after a second predetermined time period has elapsed following said transmitting of said message.

2. The apparatus of claim 1, wherein said event detector further comprises:

a memory having a plurality of memory locations each containing an event identifier field for storing an event number for identifying said event, a time-stamp field for storing a time-stamp value indicative of when said event has occurred, and an event state field for storing a plurality of event state values; and a state machine connected to said memory, said input device and said message transmitter for (i) scanning said memory for previous storage of said event number in said event identifier field of said memory locations, (ii) in the event said event number is not located after said first predetermined time period then selecting a first one of said memory locations containing a first order one of said state values in its event state field, writing said event number and said time-stamp value into said event identifier and time-stamp fields and advancing said first order state value to a second order state value in the event state field of said first memory location, (iii) in the event said event number is located after said first predetermined time period then advancing said second order state value to a third order state value, (iv) scanning said memory for any location having said third order state value stored in its event state field, (v) upon locating a memory location having said third order state value stored in its event state field activating said message transmitter for creating and transmitting said message, wherein said message includes said event number and time-stamp value, and advancing said third order state value to a fourth order state value once said message has been transmitted, (vi) repeating step (i) and (a) in the event said event number is not located then advancing said fourth order state value to a fifth order state value and (b) in the event said event number is located after said second predetermined time period then advancing said fourth order state value to said third order state value and repeating step (vi), (vii) repeating step (i) and (a) in the event said event number is not located then advancing said fifth order state value to said first order state value and (b) in the event said event number is located then advancing said fifth order state value to said fourth order state value and repeating step (vii).

3. A method for detecting an asynchronous event in a communication system and signaling occurrence of said event by transmitting a message to a predetermined device, comprising the steps of:

sampling at least one input signal location of said communication system for the occurrence of said event;

creating and transmitting said message to said predetermined device after a first predetermined time period sufficient to ensure validity of the occurrence of said event at said input; and causing said message transmitter to re-transmit said message in the event said event persists at said input device after a second predetermined time period has elapsed following said transmitting of said message.

4. The method of claim 3, comprising the further steps of:

(i) scanning a memory for previous storage of an event number in an event identifier field thereof, wherein said event number identifies said event;

(ii) in the event said event number is not located after said first predetermined time period then selecting a first memory location containing a first order state value in an event state field, writing said event number and a time-stamp value indicative of when said event has occurred into respective event identifier and time-stamp fields of said memory location and advancing said first order state value to a second order state value in the event state field of said first memory location;

(iii) in the event said event number is located after said first predetermined time period then advancing said second order state value to a third order state value;

(iv) scanning said memory for any location having said third order state value stored in its event state field;

(v) upon locating a memory location having said third order state value stored in its event state field activating said message transmitter for creating and transmitting said message, wherein said message includes said event number and time-stamp value, and advancing said third order state value to a fourth order state value once said message has been transmitted;

(vi) repeating step (i) and (a) in the event said event number is not located then advancing said fourth order state value to a fifth order state value and (b) in the event said event number is located after said second predetermined time period then advancing said fourth order state value to said third order state value and repeating step (vi); and (vii) repeating step (i) and (a) in the event said event number is not located then advancing said fifth order state value to said first order state value and (b) in the event said event number is located then advancing said fifth order state value to said fourth order state value and repeating step (vii).

* * * * *